Aug. 3, 1948.   M. E. WICKERSHAM ET AL   2,446,205
MULTIAXLE VEHICLE

Filed May 15, 1945   3 Sheets-Sheet 1

INVENTORS
MARSHALL E. WICKERSHAM
WILLIAM D. ALLISON
BY
C. E. Herrstrom & N. C. Thibodeau
ATTORNEYS

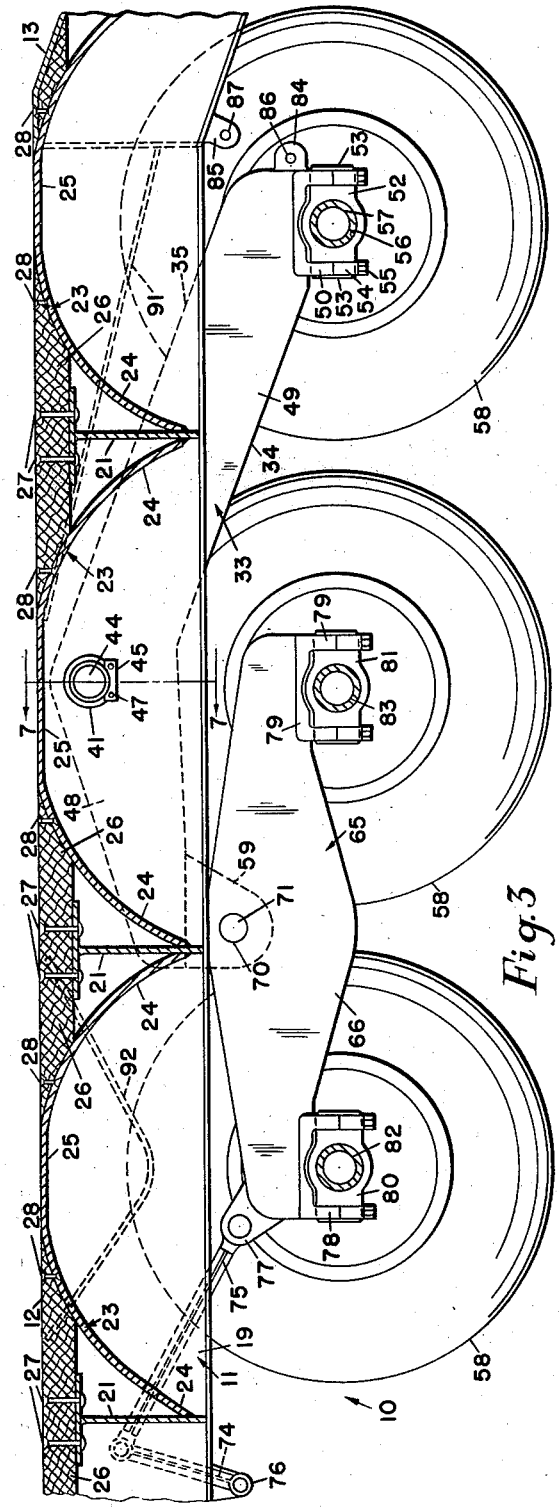

Aug. 3, 1948.    M. E. WICKERSHAM ET AL    2,446,205
MULTIAXLE VEHICLE
Filed May 15, 1945    3 Sheets-Sheet 3

INVENTORS
MARSHALL E. WICKERSHAM
WILLIAM D. ALLISON
BY
C. E. Herrstrom + H. E. Thibodeau
ATTORNEYS Patented Aug. 3, 1948

2,446,205

UNITED STATES PATENT OFFICE 2,446,205

MULTIAXLE VEHICLE

Marshall E. Wickersham and William D. Allison, Detroit, Mich.

Application May 15, 1945, Serial No. 593,915

10 Claims. (Cl. 280—104.5)

(Granted under the act of March 3, 1883, as amended April 30, 1928; 370 O. G. 757)

The invention described herein may be manufactured and used by or for the Government for governmental purposes without the payment to us of any royalty thereon.

This invention relates generally to vehicles and more particularly to multi-axle vehicles.

It is an object of the present invention to provide a vehicle having a plurality of longitudinally spaced transversely extending axles mechanically connected together and to the frame of the vehicle in such a manner as to distribute part of the load of the vehicle to each axle. One purpose of a vehicle of this type is to enable the vehicle to be supported upon a plurality of axles and a large number of wheels so that a greater load may be carried upon the vehicle and distributed over a large number of wheels.

Another object of the invention is to provide a multi-axle vehicle in which the axles are connected together and to the frame of the vehicle in such a manner as to equalize the load upon each axle. The invention also contemplates an arrangement whereby a slightly greater load is placed upon the rearward axle or axles than upon either of the axles forward thereof when the vehicle is stationary. The purpose of this arrangement is to aid in counteracting the large weight transfer from the rearward axles to the forward axles during braking of the vehicle, and also to decrease the normal static load on the front tires which absorb a large portion of all shock loads since they first encounter road obstacles. With part of the road shock absorbed by the front wheels the shock encountered by the rearward wheels is smaller in magnitude.

Still another object of the present invention is to provide a vehicle supported upon a large number of axles and wheels and in which the suspension system interconnecting the axles to each other and to the frame of the vehicle is extremely simple in construction, economical to manufacture, and relatively simple to maintain in operating condition.

The invention may be applied to any vehicle, although it has particular value in connection with vehicles adapted to carry large loads, such as trucks and trailers. Such large loads are frequently carried in commercial transportation and also in military operations. Present warfare, for example, requires the transporting of extremely heavy equipment, such as disabled combat tanks and the like. In addition such vehicles must frequently operate off paved roads and over rough terrain. Consequently, not only must a large number of wheels be provided to carry the load and to reduce the ground pressure to a reasonable figure, but a suspension system must be provided which will permit individual vertical movement of the wheels as obstacles and rough terrain are encountered. To meet these conditions the present invention provides a plurality of longitudinally spaced transversely extending axles interconnected by walking beams, the latter being pivotally connected together and to the frame of the vehicle to permit independent vertical movement of each axle and to distribute the load of the vehicle between the several axles. The walking beams extend longitudinally of the vehicle and are guided and constrained to move in a vertical plane in order to provide the necessary lateral stability.

The invention also contemplates the provision of a group of short axles under one side of the frame and a second group of short axles under the opposite side of the frame, with the axles of the second group in axial alignment with those of the first group. With one or more wheels provided upon each end of each short axle it will be seen that a large number of supporting wheels can be provided transversely of the vehicle. With this construction a group of walking beams is provided for the axles on each side of the vehicle, and the walking beams are connected to the axles in such a manner as to permit pivotal movement of each axle in a plane extending transversely of the frame to distribute the load on each axle between the wheels at the opposite ends thereof.

Other objects and advantages of the present invention will be made more apparent as this description proceeds, particularly when considered in connection with the accompanying drawings, in which:

Figure 3 is a fragmentary longitudinal cross section taken substantially on the plane indicated by the line 3—3 of Figure 6;

Figure 4 is a side elevation of the interconnected walking beams and the axle carrying trunnions pivotally mounted therein;

Figure 5 is an end view of the construction shown in Figure 4;

Figure 2:
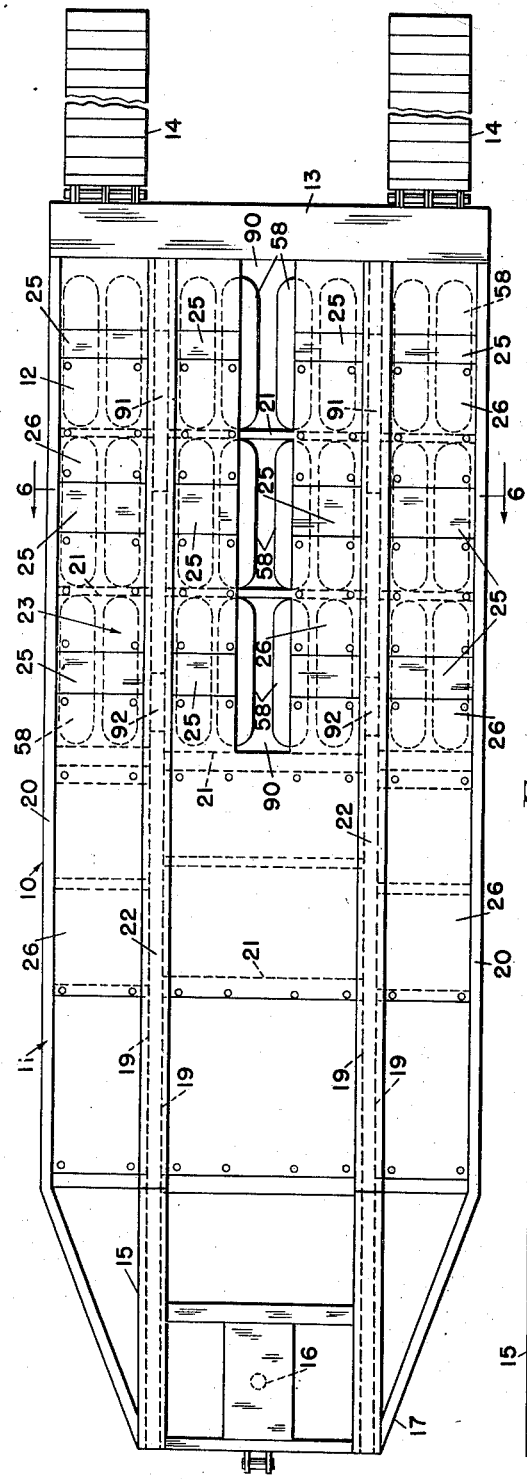
Figure 2 is a plan view thereof.
Figure 1:
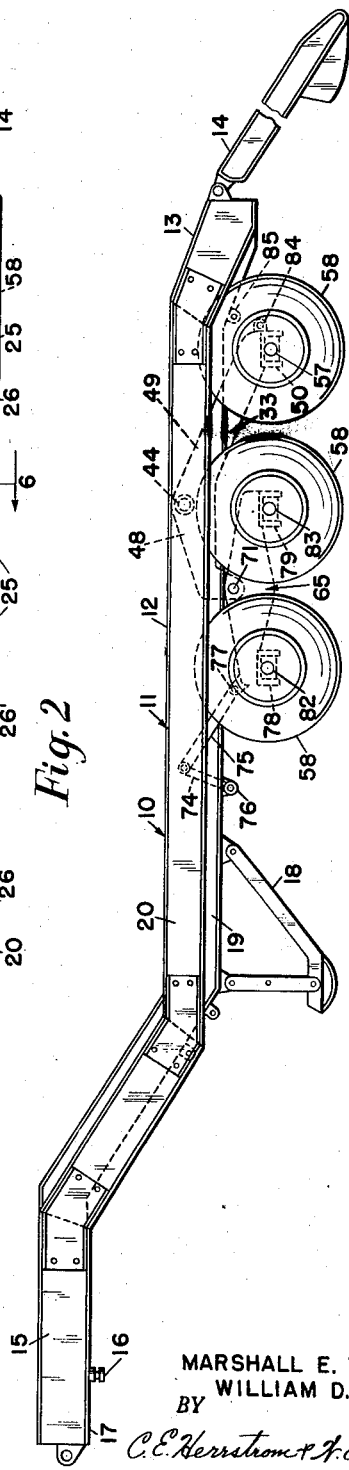
Figure 1 is a side elevation of a trailer embodying the present invention.

For the purposes of illustration, we have shown a trailer 10 embodying our invention. The particular type of trailer shown is a tank transporter used in military operations to transport disabled tanks from the scene of a battle, and also to carry combat tanks to a battle location and to thus minimize the mileage and wear of the tank. Inasmuch as present day combat tanks are extremely heavy it will be seen that the trailer must be constructed and supported in such a manner as to carry a heavy load.

The trailer 10 has a frame 11 comprising a load carrying platform 12, an inclined rearward portion 13 to which is pivotally connected a pair of loading ramps 14, and a raised forward deck 15 adapted to extend over the rearward portion of the tractor to which the trailer is adapted to be connected. Connection between the tractor and the trailer is accomplished by means of a conventional lower fifth wheel plate upon the tractor and a cooperating king pin 16 depending from the upper fifth wheel plate 17 secured to the underside of the raised deck 15 of the trailer. A pivoted landing strut 18 is provided near the forward end of the load carrying platform 12 of the trailer in order to provide support for the front end of the trailer when the latter is disconnected from the tractor. The landing strut 18 is arranged to be moved upwardly out of engagement with the ground when the trailer is being towed.

The frame 11 of the trailer comprises four main longitudinal beams 19, a pair of side channel beams 20, and a plurality of transversely extending cross frame members 21. The main longitudinal beams 19 are channel shaped in cross section and are arranged in pairs with one pair extending along with each side of the trailer. Covering each pair of longitudinal beams 19 is a longitudinal beam cover 22 extending the entire length of the trailer.

As best seen in Figure 3, there is located between each pair of longitudinal beams 19 and the adjacent side channel beam 20 a plurality of generally arcuate wheel guards 23. Similar wheel guards are provided intermediate the two pairs of longitudinal beams 19. Inasmuch as the present trailer has three axles, there are provided three rows of longitudinally spaced wheel guards 23. Each wheel guard 23 has arcuate end portions 24 secured, as by welding, to the web of a T-shaped cross frame member 21, and a flat upper portion 25 forming part of the loading platform of the trailer. Intermediate the longitudinally spaced wheel guards 23 are a plurality of wood blocks 26, preferably constructed of oak. The blocks 26 are supported upon the horizontal flanges of the cross frame members 21 and are secured thereto by the rivets 27. The ends of the blocks are shaped to fit the arcuate portions 24 of the wheel guards, being secured thereto by rivets 28. It will be noted that the upper surface of the blocks 26 forms a continuation of the flat portions 25 of the wheel guards, thus providing a complete and continuous platform upon the top of the trailer. This platform is adapted to support a tank or other unit which may be driven under its own power onto the platform 12 by means of the ramps 14, or which may be towed thereon by means of suitable winching equipment (not shown).

Figure 6:
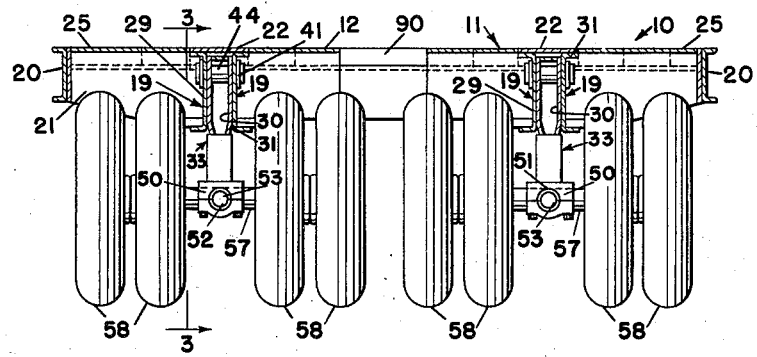
Figure 6 is a transverse cross section taken substantially on the plane indicated by the line 6—6 of Figure 2.
Figure 8:
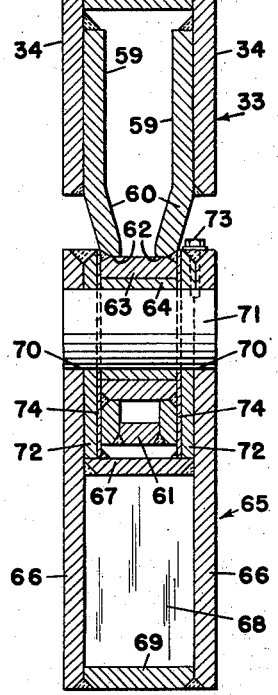
Figure 8 is a cross section taken substantially on the plane indicated by the line 8—8 of Figure 4.
Figure 7:
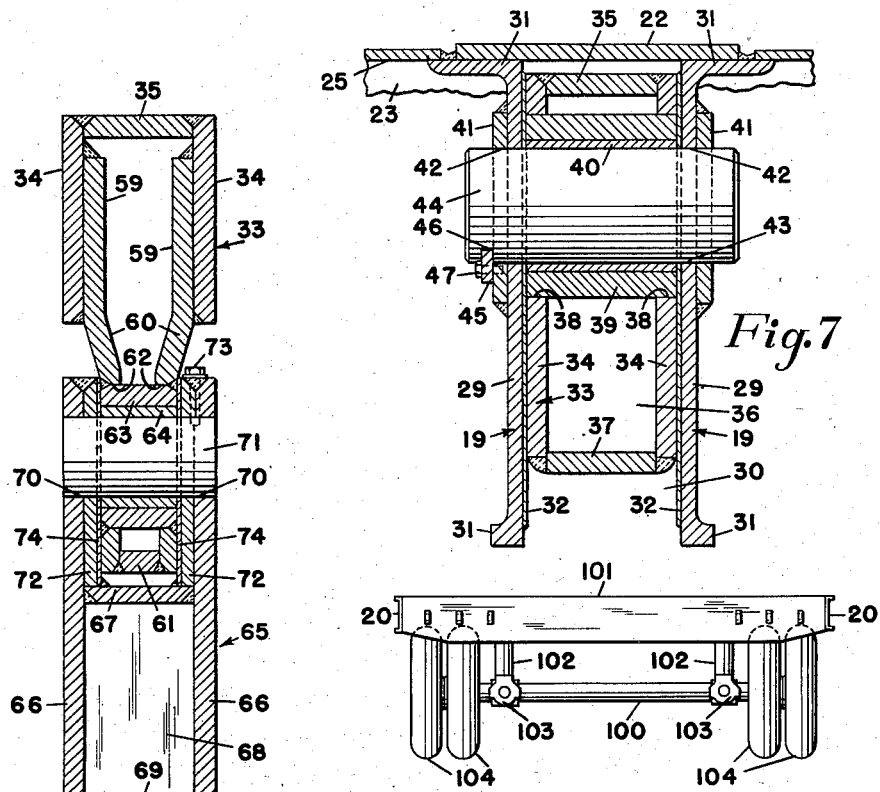
Figure 7 is a cross section taken substantially on the plane indicated by the line 7—7 of Figure 3.

Referring now particularly to Figures 6 and 7, it will be noted that each pair of longitudinal beams 19 is arranged with the bases 29 of the channel shaped beams transversely spaced from each other a predetermined distance in order to form a guide way 30 therebetween. The legs 31 of the longitudinal beams 19 extend outwardly from the guideway. Bearing plates 32 are provided upon the adjacent faces of the bases 29 of the longitudinal beams to provide bearing surfaces for the main walking beams 33.

Inasmuch as the walking beam suspension on each side of the trailer is identical, only one side will be described in detail. Each main walking beam 33 comprises a pair of transversely spaced plates 34 which are spaced apart and reinforced by ribs 35, 36 and 37. The ribs 35 extend along the upper edges of the side plates 34 and are welded thereto. The ribs 37 extend between the lower edges of the side plates, being also welded thereto. Intermediate the upper and lower ribs 35 and 37 respectively are a plurality of generally vertically extending reinforcing ribs 36.

It will be noted that the overall width of the main walking beam 33 corresponds to the width of the guide way 30 between the bearing plates 32. Since a substantial portion of the main walking beam 33 is positioned within the guide way 30, as best seen in Figure 3, it will be seen that the walking beam is guided in a vertical plane and restrained from transverse or lateral movement. This provides the necessary lateral stability to the trailer suspension.

Means are provided for pivotally connecting the main walking beam 33 to the frame of the trailer intermediate the ends of the beam. Circular apertures 38 are formed in the side plates 34 of the walking beam in axial alignment with each other. Positioned within the openings 38 and extending the width of the walking beam 33 is a supporting sleeve 39 within which is mounted a bearing sleeve 40.

Reinforcing plates 41 are welded to the outer surfaces of the bases 29 of the main longitudinal beams 19. The reinforcing plates 41 are provided with openings 42 in alignment with similar openings 43 in the bases of the longitudinal beams 19 for receiving a pivot pin 44. The pivot pin 44 is cylindrical in cross section and is locked against rotation with respect to the reinforcing plates 41 by means of a locking plate 45 fitting into a slot 46 in the pin and secured to the reinforcing plate 41 by means of bolts 47. Thus it will be seen that the pivot pin 44 is stationary and that the main walking beam 33 is mounted thereon for rotation about the bearing sleeve 40.

Referring now to Figures 3 and 4, it will be seen that the pivot pin 44 is located intermediate the ends of the main walking beam 33 and in such a position as to divide the walking beam into a short forward arm 48 and a long rearward arm 49. For a purpose which will appear later the long arm 49 is substantially twice the length of the short arm 48.

The rearward end of the long arm 49 of the main walking beam 33 is provided with a generally U-shaped bearing member 50 having semi-circular openings 51 facing downwardly. Positioned within the bearing member 50 is a trunnion 52 having opposed cylindrical end portions 53 engaging the semi-circular opening 51 in the bearing member. A bearing cap 54 is bolted to the bearing member 50 by means of bolts 55 and serves to retain the trunnion 52 in place. With this construction the trunnion 52 is rotatable within the bearing member 50 about an axis extending generally horizontally and longitudinally of the trailer. The trunnion 52 is provided with cylindrical bore 56 extending generally transversely of the trailer. The bore 56 is adapted to receive the rearward axle 57 of the trailer.

As best seen in Figure 6, the central portion of the axle 57 is mounted within the trunnion 52, and the opposite ends of the axle extending from opposite sides of the trunnion carry wheels 58. In the trailer shown in the drawings dual wheels are provided upon each end of the axle. It is noted that the rearward axles 57 on opposite sides of the trailer are in axial alignment with each other.

The forward end of the short arm 48 of the main walking beam 33 is provided with a pair of vertically disposed plates 59 welded or otherwise suitably secured to the side plates 34 of the walking beam intermediate the latter. The plates 59 are bent toward each other at 60 and the lower portions thereof are parallel to each other and are interconnected by the reinforcing web 61. Mounted within aligned apertures 62 provided in the plates 59 is a supporting sleeve 63 within which is mounted a bearing sleeve 64. The bearing sleeve 64 is adapted to rotatably engage a pivot pin connecting the main walking beam 33 to the auxiliary walking beam 65, as described later. The auxiliary walking beam 65 comprises a pair of spaced side plates 66 reinforced by ribs 67, 68 and 69. Rib 67 extends along and connects the upper edges of the side plates 66. Rib 69 interconnects the lower edges of plates 66, and the generally vertically extending ribs 68 reinforce the side plates intermediate the upper and lower ribs. Adjacent the upper portion of the side plates 66 of the auxiliary beam and substantially centrally located longitudinally thereof are aligned openings 70 for receiving a pivot pin 71. It will be noted that adjacent the pivot pin 71 the top rib 67 is depressed to provide clearance for the end of the main walking beam 33. In addition, reinforcing plates 72 are welded to the inner surfaces of the side plates 66 and strengthen the support for the pivot pin 71. The pivot pin 71 is held against rotation within the auxiliary walking beam 65 by means of the set screw 73.

As previously mentioned the plates 59 depending downwardly from the forward end of the main walking beam 33 are bent inwardly toward each other to form a narrow section. The width of this section is such that it may be received within the auxiliary walking beam 65 between the reinforcing plates 72. Thin bearing plates 74 are provided upon the adjacent faces of the reinforcing plates 72 for the purpose of providing bearing surfaces engaging the portion of the main walking beam extending therebetween. Thus, it will be seen that not only are the main and auxiliary walking beams 33 and 65 respectively connected together by the pivot pin 71, but the auxiliary walking beam 65 is guided for movement in a vertical plane and restricted against lateral deflection.

Additional lateral stability of the auxiliary walking beam 65 is achieved by means of the pivotally connected tie rods 74 and 75. The tie rod 74 is pivotally mounted upon a bracket 76 depending from the longitudinal beam 19 and the tie rod 75 is pivotally connected to a bracket 77 extending forwardly from the forward end of the auxiliary walking beam 65. The pivotal connection between the tie rods 74 and 75, between the tie rod 74 and the frame of the trailer, and between the tie rod 75 and the auxiliary walking beam are constructed to resist lateral movement and accordingly afford stability to the auxiliary walking beam in a transverse direction.

The forward and rearward ends of the auxiliary walking beam 65 are provided with channel shaped bearing members 78 and 79 respectively, similar in construction to the bearing member 50 at the rearward end of the main walking beam 33, and receive trunnions 80 and 81 respectively which are identical in construction with the trunnion 52 supporting the rear axle 57. Mounted within the trunnions 80 and 81 are axles 82 and 83 respectively, which extend transversely of the trailer. As in the case of the rear axle 57, axles 82 and 83 extend slightly less than half way across the trailer, and identical axles are provided in alignment therewith on the opposite side of the trailer, the latter being supported upon similar trunnions and walking beams.

In most vehicles it will be found desirable to substantially equalize the load carried by each axle and by each wheel. Equalizing of the load between axles 82, 83 and 57 can be readily accomplished by pivoting the main walking beam 33 at a point intermediate its ends so that the rearward arm 49 between the pivot pin 44 and the rear axle 57 is substantially twice the length of the forward arm 48 between the pivot pins 44 and 71, and by locating the pivot pin 71 substantially midway between the axles 82 and 83. Inasmuch as the arms of the walking beams are somewhat inclined with respect to each other, for accuracy the distances between the pivot pins and the axles must be measured along a horizontal plane parallel to the ground.

This construction results in equal longitudinal spacing of the three axles. Since the short arm 48 of the main walking beam supports the two forward axles 82 and 83 and is half the length of the long arm 49 supporting the single rear axle 57, it follows that the load supported by the rear axle 57 is one-half the load transmitted to the two front axles through the pivot pin 71. The load at the pivot pin 71 is equally divided between axles 82 and 83 inasmuch as the pivot point is midway between these axles. Accordingly an equal load is carried by each of the three axles.

As previously described, each axle is transversely pivoted for movement about its respective trunnion, thus distributing the load on each axle between the wheels at opposite ends thereof. Inasmuch as the wheels are equally spaced on opposite sides of the trunnion it follows that an equal load will be carried upon each wheel. Accordingly each wheel of the trailer supports an equal load under static conditions.

During certain types of operation it may be desirable to operate the trailer on only two of the three axles. For example, with no load or only a light load, tire wear can be saved by raising one axle out of engagement with the ground. In the present instance this is accomplished by providing a bracket 84 at the rearward end of the main walking beam 33, and a cooperating bracket 85 upon the rearward portion 13 of the trailer frame. Brackets 84 and 85 are provided with holes 86 and 87 respectively. To render the rear axle 57 inoperative it is lifted until the holes 86 and 87 in the aforementioned brackets are in alignment. A suitable pin or bolt (not shown) is inserted through the holes, thus holding the wheels on the rear axle out of engagement with the ground. When the main walking beam 33 is thus locked in raised position, the pivot pin 71 becomes fixed relative to the trailer frame. The auxiliary walking beam pivots on pivot pin 71 and the load of the trailer is distributed between the two front axles 82 and 83. This arrangement also facilitates turning the trailer.

During rapid deceleration of the trailer, such as during the braking thereof, the weight of the trailer and the load carried thereon are shifted forwardly thus imposing a greater load upon the forward axles. If desired, this may be partially compensated for by placing a predetermined greater load upon the rearward axle or axles of the trailer during static conditions, so that during braking the increased load upon the front axles will tend to effect a substantially balanced condition. This can be accomplished in several manners, as for example, by positioning the pivot pin 44, connecting the main walking beam 33 to the frame of the trailer, at a point such that the long rearward arm 49 is somewhat less than twice the length of the short forward arm 48. With this arrangement a greater static load is placed upon the rear axle 57 than upon either of the forward axles 82 and 83.

Another advantage in placing a greater static load on the rearward axles and a smaller static load on the forward axle is that since the front tires first encounter road obstacles they are required to absorb greater shock loads than the rearward axles. A smaller static load on the tires facilitates the absorption of these shocks.

The static load can, accordingly, be distributed in any desired manner between the several axles according to the particular requirements. For example, the axles may be progressively loaded, with the greater load on the rear axle.

The pair of wheels 58 on each axle adjacent the outside of the trailer are readily accessible for removal for repair or replacement purposes. To enable the pair of wheels on the inner end of each axle to be accessible for like purposes, the platform 12 of the trailer is provided with a longitudinally extending centrally disposed opening or well 90.

Upward movement of the walking beams 33 and 65 is limited by spacers 91 and 92 respectively, which are plates secured in between the main longitudinal beams 19 and which also serve to maintain the beams properly spaced to form the guideway for the walking beams.

Figure 9:
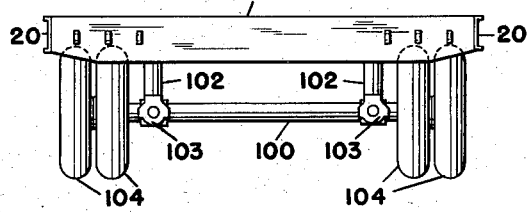
Figure 9 is an end view of a trailer embodying a slight modification of the invention.

Figure 9 shows a slight modification in which the axle 100 extends completely across the width of the trailer frame 101 and is supported by walking beams 102 and trunnions 103. Dual wheels 104 are provided on the ends of the axles. This construction differs from that shown in Figures 1 to 8 inclusive only in that the short aligned axles are replaced by long axles 100 and the central dual wheels are eliminated.

The construction shown in Figures 1 to 8 inclusive is adapted to support very heavy loads on the trailer since a large number of wheels are used. When lighter loads are to be carried and a smaller number of wheels are sufficient to adequately support the load, the construction shown in Figure 9 can be used.

Although the trailer shown and described has three axles it will be apparent that any number of axles may be provided and that a similar system of walking beams may be used to interconnect the axles and to distribute the load therebetween. It is likewise apparent that with a three axle trailer, such as shown, the auxiliary walking beam may interconnect the middle and rear axles rather than the front and middle axles, with the main walking beam connected between the front axle and the auxiliary walking beam.

Although we have shown and described certain embodiments of our invention, it will be understood that we do not wish to be limited to the exact construction shown and described, but that various changes and modifications may be made without departing from the spirit and scope of the invention, as defined by the appended claims.

What we claim is:

1. A vehicle comprising a frame, three longitudinally spaced axles extending transversely of said frame, wheels on said axles, a walking beam, means pivotally connecting to said walking beam two of said axles for individual pivotal movement of the latter in a plane extending transversely of said frame, and a second walking beam having a pivotal connection with said frame, said pivotal connection being intermediate the ends of the beam and dividing the latter into two arms, one of said arms being pivotally connected to the third of said three axles for pivotal movement of the latter in a plane extending transversely of said frame, the other of said arms being pivotally connected to said first mentioned walking beam intermediate the ends of the latter to distribute part of the load of said vehicle to each of said three axles, the said walking beam acting to guide said axles for movement relative to said frame in substantially vertical respective planes only.

2. A vehicle comprising a frame, three longitudinally spaced axles extending transversely of said frame, wheels on said axles, a walking beam, means pivotally connecting to said walking beam the forward two of said axles for individual pivotal movement of the latter in a plane extending transversely of said frame, and a second walking beam having a pivotal connection with said frame, said pivotal connection being intermediate the ends of the beam and dividing the latter into two arms, one of said arms being pivotally connected to the rearward axle of said three axles for pivotal movement of said rearward axle in a plane extending transversely of said frame, the other of said arms being pivotally connected to said first mentioned walking beam intermediate the ends of the latter to distribute part of the load of said vehicle to each of said three axles, the said walking beams being adapted to maintain the said three axles fixed longitudinally relative to each other and to said frame.

3. A vehicle comprising a frame, three longitudinally spaced axles extending transversely of said frame, wheels on said axles, a walking beam, means pivotally connecting to said walking beam two of said axles for individual pivotal movement of the latter in a plane extending transversely of said frame, a second walking beam having a pivotal connection with said frame, said pivotal connection being intermediate the ends of the beam and dividing the latter into two arms with one arm substantially twice the length of the other arm, means pivotally connecting the long arm of said second walking beam to the third of said three axles for pivotal movement of the latter in a plane extending transversely of said frame, and means pivotally connecting the short arm of said second walking beam to said first mentioned walking beam substantially midway between the two axles connected thereto to substantially equalize the load on said three axles, said walking beams acting to guide said axles for movement relative to said frame in substantially vertical planes only, whereby the said wheels rotate in substantially aligned planes.

4. A vehicle comprising a frame, three longitudinally spaced axles extending transversely of said frame, wheels on said axles, a walking beam, means pivotally connecting to said walking beam two of said axles for individual pivotal movement of the latter in a plane extending transversely of said frame, a second walking beam, means pivotally connecting to said second walking beam the third of said three axles for pivotal movement of the latter in a plane extending transversely of said frame, a pivotal connection between said second walking beam and said first mentioned walking beam, a pivotal connection between said second walking beam intermediate its ends and said frame, said pivotal connections between said first mentioned and second walking beams and between said second walking beam and said frame being spaced relative to each other and to said axles in such a manner that a greater load is placed upon the rearward axle than upon either of the other two axles when the vehicle is stationary, and means carried by said frame for guiding said walking beams on said frame for movement substantially in a vertical plane and restricting said walking beams against lateral deflection.

5. A vehicle comprising a frame, three longitudinally spaced axles extending transversely of said frame, wheels on said axles, a walking beam, means pivotally connecting to said walking beam the forward two of said three axles for individual pivotal movement of the latter in a plane extending transversely of said frame, a second walking beam having a pivotal connection with said frame, said pivotal connection being intermediate the ends of the beam and dividing the latter into two arms with the rearward arm slightly less than twice the length of the forward arm, means pivotally connecting the rearward arm of said second walking beam to the rearward axle of said three axles for pivotal movement of the latter in a plane extending transversely of said frame, means pivotally connecting the forward arm of said second walking beam to said first mentioned walking beam substantially midway between the two axles connected thereto to place a greater load on the rearward axle when the vehicle is stationary than upon either of the two forward axles, and means acting to guide said axles for movement relative to said frame in substantially vertical respective planes only.

6. A vehicle comprising a frame, a plurality of longitudinally spaced axles extending transversely of said frame, wheels on the opposite ends of said axles, a plurality of walking beams extending longitudinally of said frame and pivotally connected to each other and to said frame, and means connecting said walking beams to said axles to distribute part of the load of said vehicle to each of said axles, said means permitting pivotal movement of each of said axles in a plane extending transversely of said frame.

7. A vehicle comprising a frame, a group of longitudinally spaced short axles under one side of said frame and extending transversely of said frame, a second group of transversely extending short axles under the opposite side of said frame, the axles of said second group being in axial alignment with the axles of said first group, wheels on the opposite ends of said axles, a group of walking beams associated with each of said groups of axles, the walking beams in each group being pivotally connected together and to said frame, means connecting the walking beams in each group to the axles in the associated group of axles to distribute part of the load of said vehicle to each of said axles, said means permitting pivotal movement of each of said axles in a plane extending transversely of said frame.

8. A vehicle comprising a frame, a group of three longitudinally spaced short axles under one side of said frame and extending transversely thereof, a second group of three transversely extending axles under the opposite side of said frame, the axles of said second group being in axial alignment with the axles of said first group, wheels on the opposite ends of said axles, a pair of longitudinally extending walking beams associated with each of said groups of axles, means connecting said walking beams to said axles, said means permitting pivotal movement of each of said axles in a plane extending transversely of said frame, means pivotally connecting together the two walking beams in each pair, and means pivotally connecting one walking beam in each pair to said frame, said pivotal connections being arranged so that substantially an equal load is placed upon each of said axles.

9. A vehicle comprising a frame, a plurality of longitudinally spaced axles extending transversely of said frame, wheels on the opposite ends of said axles, a plurality of walking beams extending longitudinally of said frame and pivotally connected to each other and to said frame, means connecting said walking beams to said axles to distribute part of the load of said vehicle to each of said axles, and independent pin-connectable means carried by said frame and one of said walking beams, respectively, the said means being adapted to cooperate for locking one of said axles in a raised inoperative position after the walking beam has been moved generally vertically on its pivotal connections.

10. A vehicle comprising a frame, a plurality of longitudinally spaced axles extending transversely of said frame, wheels on the opposite ends of said axles, a plurality of walking beams extending longitudinally of said frame on each side of said vehicle and pivotally connected to each other and to said frame, and means connecting said walking beams to said axles near the ends thereof to distribute part of the load of said vehicle to each of said axles, said means permitting pivotal movement of each of said axles in a plane extending transversely of said frame.

MARSHALL E. WICKERSHAM.
WILLIAM D. ALLISON.

REFERENCES CITED

The following references are of record in the file of this patent:

UNITED STATES PATENTS

| Number | Name | Date |
|---|---|---|
| 1,629,079 | Knox | May 17, 1927 |
| 1,641,848 | Griffin | Sept. 6, 1927 |
| 1,905,242 | Rogers et al. | Apr. 25, 1933 |
| 2,051,864 | Knox et al. | Aug. 25, 1936 |
| 2,359,299 | Brown | Oct. 3, 1944 |

FOREIGN PATENTS

| Number | Country | Date |
|---|---|---|
| 6,014/27 | Australia | Feb. 18, 1927 |